United States Patent [19]

Coden

[11] Patent Number: 4,789,982
[45] Date of Patent: Dec. 6, 1988

[54] METHOD FOR IMPLEMENTING A TOKEN PASSING RING NETWORK ON A BUS NETWORK

[75] Inventor: Michael H. Coden, New York, N.Y.

[73] Assignee: Codenoll Technology Corporation, Yonkers, N.Y.

[21] Appl. No.: 823,155

[22] Filed: Jan. 27, 1986

[51] Int. Cl.$^4$ ............................................. H04J 3/26
[52] U.S. Cl. ........................................ 370/85; 370/89
[58] Field of Search ............................ 370/85, 86, 89; 340/825.5, 825.51, 825.05

[56] References Cited

U.S. PATENT DOCUMENTS 4,491,946 1/1985 Kryskow, Jr. et al. ............... 370/89
4,549,291 10/1985 Renoulin et al. ...................... 370/89

Primary Examiner—Douglas W. Olms
Attorney, Agent, or Firm—Pennie & Edmonds

[57] ABSTRACT

A method is disclosed for implementing a token ring network on a token bus network. In accordance with the invention a token ring node is connected to each one of a plurality of token bus nodes such that the token ring node appears to the token bus node to which it is connected as station equipment and the token bus node appears to the token ring node as both the next token ring node and the preceeding token ring node in a ring network. A message is transmitted from a token ring node by forming a token ring frame and transmitting the token ring frame to the next token ring node which is the token bus node to which the token ring node is connected. The token bus node encapsulates the token ring frame that it receives in a token bus frame and transmits the resulting token bus frame to a destination bus node. The destination bus node receives the token bus frame, removes the token ring frame that is encapsulated therein and forwards the token ring frame to the token ring node connected to the destination bus node.

1 Claim, 3 Drawing Sheets

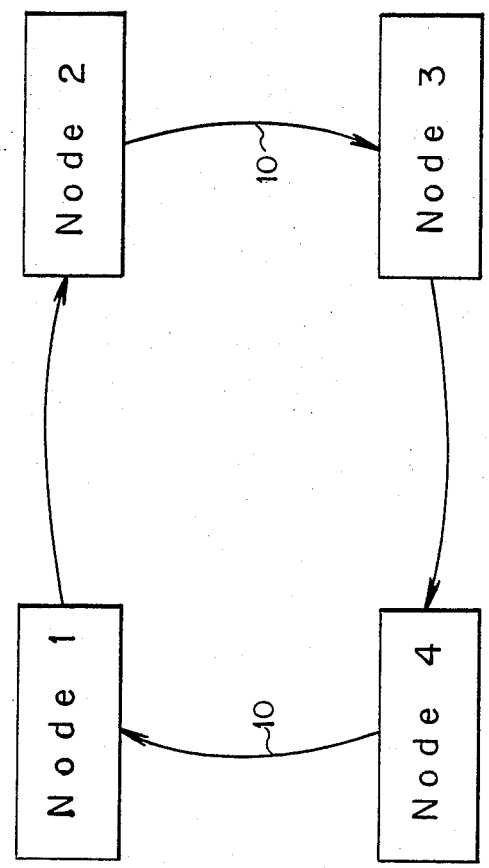

METHOD FOR IMPLEMENTING A TOKEN PASSING RING NETWORK ON A BUS NETWORK

BACKGROUND OF THE INVENTION

This relates to a method and apparatus for implementing a token ring communication system on a token bus communication system. Advantageously, the token bus communication system conforms to ANSI/IEEE Standard 802.4 for *Token-Passing Bus Access Method and Physical Layout Specifications and the token ring communication system conforms to ANSI/IEEE Standard* 802.5 for *Token Ring Access Method and Physical Layout Specifications.*

These standards are incorporated herein by reference.

A token ring communications network consists of serially interconnected elements or nodes that form a physical ring structure. Each node transfers information sequentially from one active element to the next. Each node may have other devices attached such as computer terminals, printers, disk drives and the like which will be referred to as station equipment; and the node provides the mechanism for each of these devices to communicate with a corresponding device over the ring.

Access to the ring for purposes of communication is controlled by a token which circulates through the ring at all times. The token is either free, if the ring may be used for communication, or busy, if a message is being sent from a sending mode to a destination node. The token and any information that accompanies it pass from one node to the next in the ring structure. Each node that receives the token and accompanying information examines the entire message and token as received and regenerates and retransmits them to the next node.

When a node wants to transmit, it waits for a free token. Upon receiving a free token, it transmits to the next node a frame comprising message information, source and destination node address, various control information and the token which is now identified as busy. As the frame passes around the ring, each node notes that the token is busy, examines the destination address to see if the message is intended for it, checks the source address to determine if it originated the message and regenerates and retransmits the message and token.

When the frame reaches the destination node, that node recognizes that the message is addressed to it, copies the message, sets a bit in the frame that indicates that it copied the message and passes the message to the next node.

When the frame reaches the source or originating node, that node recognizes the source address, resets the token to free, removes the data and forwards the token to the next node. It also checks the copy bit to see if the data was copied and compares the data and address received with those transmitted to detect possible errors in transmission.

To prevent a faulty node from disabling the system, one node is designated the active monitor. If the monitor does not see a free token pass within a specified time limit, it purges any circulating message and generates a free token. Likewise if the monitor sees the same message pass more than once, it purges the message and generates a free token. To protect against failure of the active monitor, each node also has a timeout feature that is reset by free tokens. If the node times out before a free token is received, another node is designated the active monitor.

A token bus communications network comprises two or more nodes that are physically connected together by a communications bus. The token bus is similar to the token ring inasmuch as a token is utilized to grant access to a node to trnnsmit information. The major difference is that while the token ring is a *physical* ring, the token bus is a *logical* ring. Logic programmed into each node tells it to pass the token only to a specifically addressed node. By this means all of the nodes are linked together in a logical ring. A node gains access to the bus when the token is sent to it. Upon receiving the token, each node in turn transmits information over this bus, addressed to any node connected to the bus. All stations hear all of the information being sent with only the addressed station taking action. After a node has sent all of its information or the token timer is exceeded, the token is passed to the next node in the logically defined ring.

SUMMARY OF THE INVENTION

The present invention is a method of implementing a token ring network on a token bus network. In accordance with the invention a token ring node is connected to each one of a plurality of token bus nodes such that the token ring node appears to the token bus node to which it is connected as station equipment and the token bus node appears to the token ring node as both the next token ring node and the preceeding token ring node in a ring network.

A message is transmitted from a token ring node by forming a token ring frame and transmitting the token ring frame to the next token ring node which is the token bus node to which the token ring node is connected. The token bus node encapsulates the token ring frame that it receives in a token bus frame and transmits the resulting token bus frame to a destination bus node. The destination bus node receives the token bus frame, removes the token ring frame that is encapsulated therein and forwards the token ring frame to the token ring node connected to the destination bus node.

As a result of this process, the token bus network emulates a token ring network and the token bus network is transparent to the nodes of the token ring network.

BRIEF DESCRIPTION OF THE DRAWINGS

These and other objects, features and advantages of our invention will be more readily apparent from the following detailed, description of a preferred embodiment of the invention in which:

FIG. 1 is a schematic illustration of a token ring network,

FIG. 2 is a schematic illustration of a token ring frame,

DETAILED DESCRIPTION OF A PREFERRED EMBODIMENT

As shown in FIG. 1, a illustrative embodiment of a token ring network comprises nodes 1, 2, 3, 4 interconnected in a ring structure 10 by means of suitable cabling such as wire or fiber optics. The operation of such a network has been summarized above and the details are well known in the art. An illustrative frame for a token ring network is shown in FIG. 2 and the elements of that frame are defined in Table I.

TABLE I

| | |
|---|---|
| SD = | Starting Delimeter |
| AC = | Access Control |
| FC = | Frame Control |
| DA = | Destination Address |
| SA = | Source Address |
| INFO = | Information |
| FCS = | Frame Check Delimiter |
| ED = | Ending Delimiter |
| FS = | Frame Status |

Figures 3, 4:
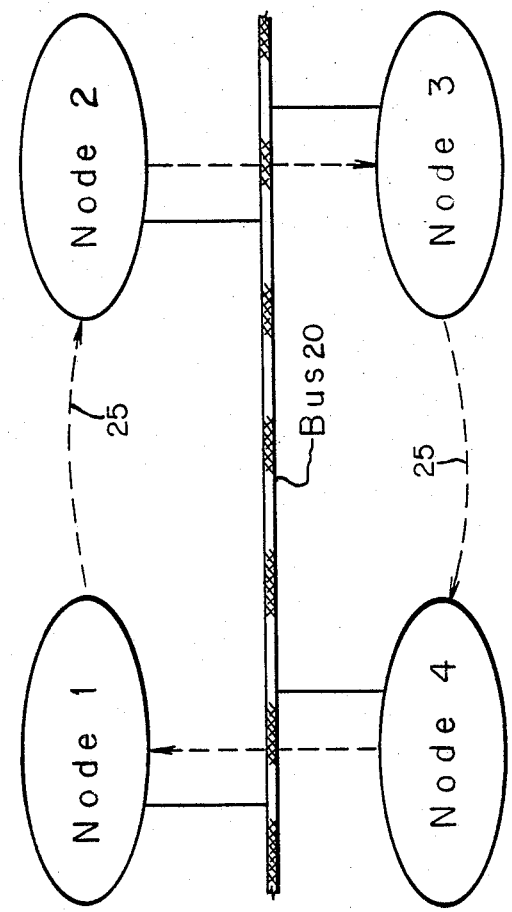
FIG. 3 is a schematic illustration of a token bus network.
FIG. 4 is a schematic illustration of a token bus frame.

As shown in FIG. 3, a illustrative embodiment of a token bus network comprises nodes 1, 2, 3, 4 interconnected by a physical bus 20 by means of suitable cabling such as wire or fiber optics. The nodes are also interconnected by a logical structure 25. The operation of such a network has been summarized above and the details are well known in the art.

An illustrative frame for a token bus network is shown in FIG. 4 and the elements of that frame are defined in Table II.

TABLE II

| | |
|---|---|
| P = | Preamble |
| SD = | Starting Delimiter |
| FC = | Frame Control |
| DA = | Destination Address |
| SA = | Source Address |
| INFO = | Information |
| FCS = | Frame Check |
| ED = | Ending Delimiter |

In accordance with the invention, a token bus network can be made to simulate a token ring network by connecting each node of the token ring network to one of the nodes of the token bus network and providing a suitable interface between each token bus node and each token ring node. The interface makes the token ring node appear to the token bus node to which it is connected as station equipment such as a personal computer, a printer, a disk drive or any other type of equipment that ordinarily is connected to the nodes of a local area network. The interface also makes a token bus node appear to the token ring node to which it is connected as both the next token ring node in the ring structure and the preceeding token ring node in the ring structure.

Figures 5, 6:
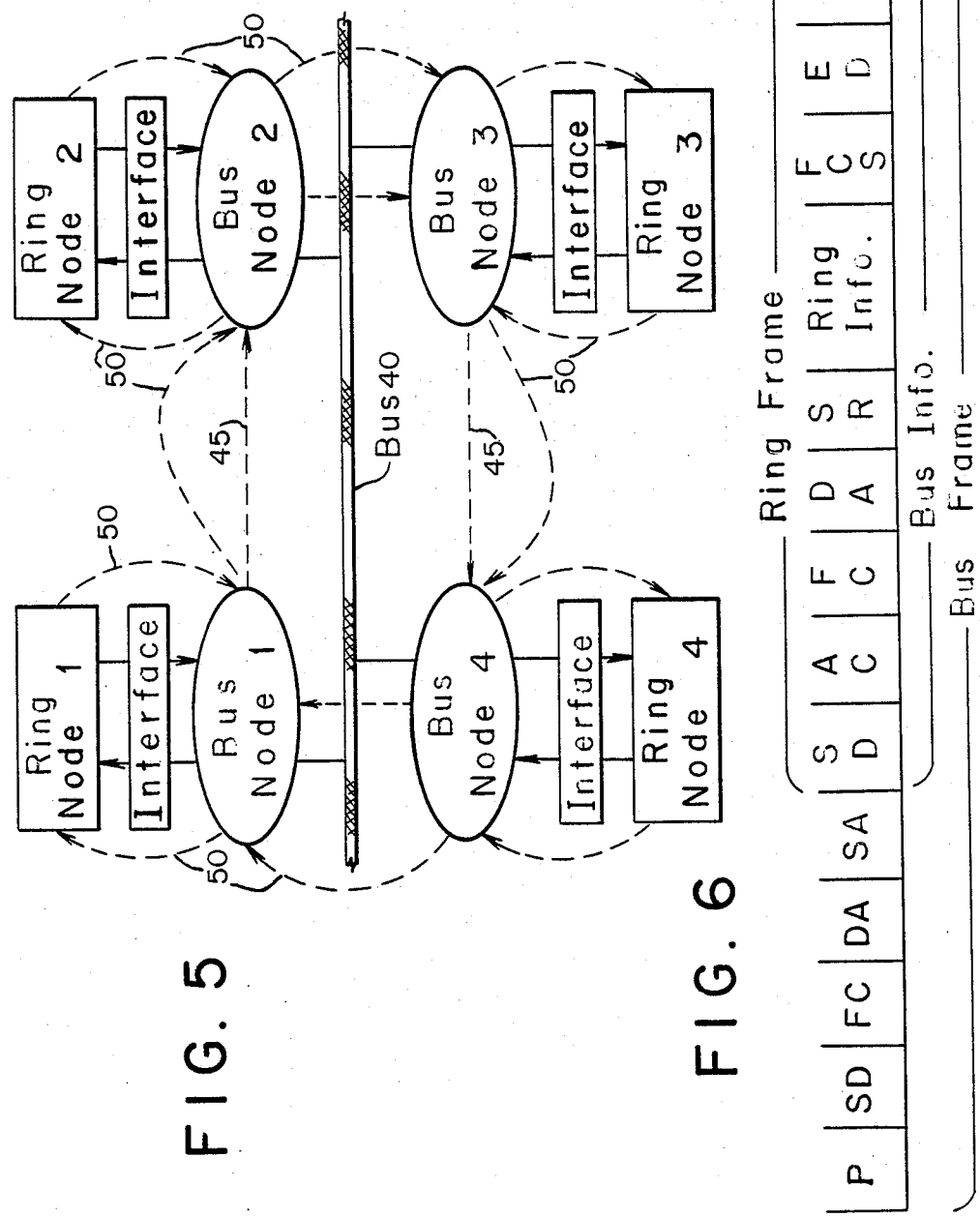
FIG. 5 is a schematic illustration of a token bus network of the present invention as modified to emulate a token ring network.
FIG. 6 is a schematic illustration of a token bus frame of the present invention with a token ring frame encapsulated therein.

As shown in FIG. 5, the illustrative apparatus of the present invention comprises four bus nodes 1, 2, 3, 4, four ring nodes 1, 2, 3, 4 and four interfaces 31, 32, 33, 34, one each between each bus node and a ring node. The bus nodes are physically interconnected by bus 40 and are logically interconnected in a ring structure 45. Each of the ring nodes is interconnected to a bus node so as to form a ring structure 50.

In accordance with the invention, a message is transmitted from a token ring node by forming a token ring frame and transmitting the token ring frame to the next token ring node which is the token bus node to which the token ring node is connected. The token bus node encapsulates the token ring frame that it receives in a token bus frame and transmits the resulting token bus frame via bus 40 to a destination bus node. The destination bus node receives the token bus frame, removes the token ring frame that is encapsulated therein and forwards the token ring frame to the token ring node connected to the destination bus node.

What is claimed is:

1. A method of implementing a token passing ring network on a bus network wherein a plurality of bus nodes are interconnected by a bus and one of a plurality of ring nodes is selected to transmit by passing a token from ring node to ring node, said method comprising the steps of:

connecting a token ring node to each one of a plurality of bus nodes such that the token ring node appears to the bus node as terminal equipment and the bus node appears to the ring node as both the next token ring node and the preceding token ring node in a ring network, transmitting a token ring frame from a token ring node to a bus node to which the ring node is connected, encapsulating the token ring frame received at the bus node in a bus frame, transmitting the bus frame including the encapsulated token ring frame to a destination bus node, and transmitting the ring frame received in the encapsulated bus frame at the destination bus node to a ring node connected to the destination bus node.

* * * * *